June 10, 1941.　　G. E. SHELDRICK　　2,245,446

CUTTING TOOL

Filed June 19, 1939

INVENTOR.
GEORGE E. SHELDRICK

BY

ATTORNEYS

Patented June 10, 1941

2,245,446

UNITED STATES PATENT OFFICE 2,245,446

CUTTING TOOL

George E. Sheldrick, Detroit, Mich.

Application June 19, 1939, Serial No. 279,956

7 Claims. (Cl. 29—105)

The invention relates to cutting tools and refers more particularly to cutting tools such as reamers, milling cutters, and the like of the inserted blade type.

The invention has for one of its objects to provide an improved construction of cutting tool of the inserted blade type in which the blades are effectively secured to the body in a manner allowing of a relatively large number of blades without objectionably weakening the body.

The invention has for another object to provide an improved blade securing means comprising a member movable into clamping relation in a direction generally toward the axis of the body.

The invention has for a further object to provide an improved blade securing assembly which will be held from accidental disengagement from the body when the blade is removed and which, however, may be removed if desired.

These and other objects of the invention will become apparent from the following description and claims, taken in connection with the accompanying drawing, in which Figure 1 is a perspective view of a portion of a cutting tool showing an embodiment of my invention;

Figure 1:
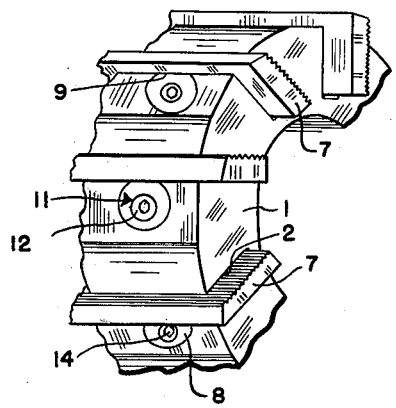
Figure 2:
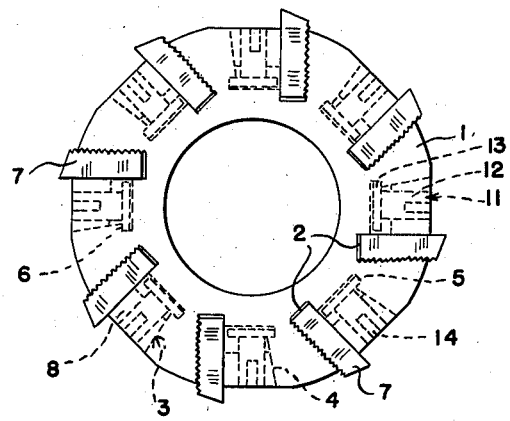
Figure 2 is a side elevation thereof.
Figure 3:
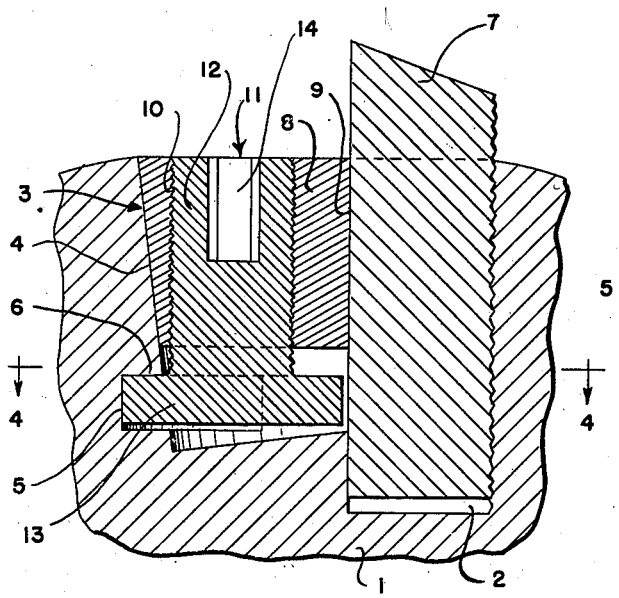
Figure 3 is an enlarged sectional elevation.
Figure 4:
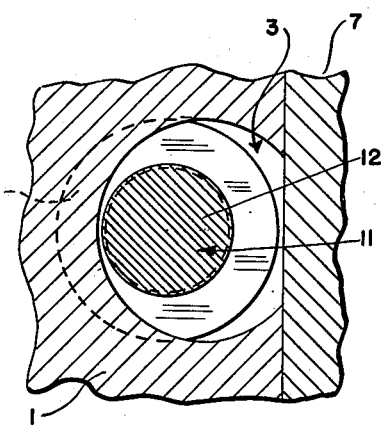
Figure 4 is a cross section on the line 4—4 of Figure 3.

In the present instance, the cutting tool embodying my invention is a milling cutter having the body 1 which is adapted to be mounted upon a suitable arbor. The body is provided with the series of angularly spaced generally radial slots 2 opening outwardly and also having open ends. The body is also provided with the generally radially outwardly opening recesses 3 with a recess intersecting each slot at one side thereof and located between the ends of the body. Each recess, as shown, has its axis inclined at an angle to the radius of the body passing through its axis inwardly and toward the slot 2. Each recess has the outer portion 4 and the inner portion 5 which is enlarged in a direction away from the slot 2 to form an undercut portion with the shoulder 6 at its radially outer side. The undercut portion and shoulder are semi-circular. The undercut portion is preferably formed by a cutting tool which is inserted into the recess to its bottom and then moved laterally away from the slot 2. The width of the opening at the intersection of the slot and recess is less than the diameter of the outer portion of the recess.

7 is a cutting blade located within each slot 2. As shown, the side of each slot opposite the recess intersecting the slot is serrated and the engaging side of the blade is correspondingly serrated with the serrations extending axially of the body. However, these sides of the slot and blade may be provided with generally radially extending serrations or they may be plane surfaced. 8 is a clamping member or wedge extending within each recess. Each clamping member is slidable axially within the outer portion 4 of its recess and has the flat face 9 extending parallel to the adjacent face of the associated blade and adapted to engage the same. Each clamping member or wedge has the internally threaded bore 10 extending longitudinally therethrough on a radius of the body of the cutting tool. 11 is a member associated with each clamping member or wedge for adjusting the same. This adjusting member is in the nature of a screw having the shank 12 threadedly engaging the internally threaded bore of the clamping member or screw and the head 13 providing an offset portion extending freely into the offset inner portion of the recess. The diameter of the head is such that it is adapted to slightly clear the blade when inserted into the slot in the body and the clearance is sufficient to allow the necessary lateral movement of the screw to secure the required clamping pressure of the clamping member or wedge upon the blade. The radially outer end of each screw is provided with suitable tool engaging means for rotating the screw and, as shown in the present instance, the radially outer end is formed with the polygonally shaped socket 14 for engaging a correspondingly shaped tool.

To assemble the parts, the adjusting member or screw is first inserted into place, after which the clamping member or wedge is inserted into operative relation to the screw. If the blade is located in the slot it will hold the clamping member or wedge from rotation while rotating the screw to feed the clamping member or wedge generally radially inwardly relative to the body. However, if the blade is not in place, the clamping member or wedge should be held from rotation while it is being fed. It will be noted that during the rotation of the screw to move the clamping member or wedge into clamping relation with respect to the blade the radially outer surface of the head of the screw engages the shoulder at the radially outer side of the undercut inner portion of the recess so that the screw is held from movement axially of itself. At the same time the force created by the generally radially inward movement of the clamping member or wedge reacts in a favorable direction upon the body of the tool and is generally opposed to that exerted upon the shoulder. It will also be seen that the screw, in addition to positively moving the wedge into clamping relation, will also positively move the screw into releasing position, at which time the radially inner surface of the head of the screw engages the bottom of the recess. In addition, it will be seen that the clamping assembly, comprising the clamping member or wedge and the adjusting member or screw, is held from accidental disengagement from the body after the clamping member or wedge has been moved to released position and the blade removed. However, if it is desired to remove the clamping assembly this can be readily done by further turning of the adjusting member or screw to move the clamping member or wedge generally radially outwardly and out of threaded relation to the adjusting member or screw, after which the clamping member or wedge may be removed and then the adjusting member or screw may be disengaged.

What I claim as my invention is:

1. In a cutting tool a body having a generally radial slot and a generally radial recess, intersecting the slot, a cutting blade extending within the slot, a generally radially movable member extending within the recess adapted to clamp said blade in place, a generally radial member rotatable to move said clamping member generally radially inwardly into clamping relation with said blade, and cooperating means upon said body and generally radial member for holding the latter from generally radial movement relative to the former during the rotation of said generally radial member to move said clamping member to clamping relation, 2. In a cutting tool, a body having a slot and a recess intersecting the slot, a cutting blade extending within the slot, an axially movable clamping member extending within the recess, said clamping member being movable generally toward the axis of said body into clamping relation with said blade, and a rotatable adjusting member for said clamping member held from movement axially of itself and relative to said body during the rotation of said adjusting member to move said clamping member to clamping relation.

3. In a cutting tool, a body having a slot and a recess intersecting the slot, the recess having an undercut portion at its inner end, a cutting blade extending within the slot, a wedge extending within the recess movable axially and generally toward the axis of said body into clamping relation with said blade, and a screw threadedly engaging said wedge and having an offset portion extending within the undercut portion of the recess.

4. In a cutting tool, a body having a slot and a recess intersecting the slot, the recess being formed with an undercut portion at its inner end, a cutting blade extending within the slot, an internally threaded wedge extending within the recess and movable generally toward the axis of said body into clamping relation with said blade, and a screw having a shank threadedly engaging said wedge and an offset portion extending within the undercut portion of said recess and spaced from said blade.

5. In a cutting tool, a body having a slot and a recess intersecting the slot, a cutting blade extending within the slot, a member extending within the recess adapted to clamp said blade in place, a second member adapted to move said clamping member, and cooperating means upon said body and second member for limiting the movement in opposite directions of said second member relative to said body.

6. In a cutting tool, a body having a slot and a recess intersecting the slot, a cutting blade extending within the slot, a wedge extending within the recess adapted to clamp said blade in place, a screw adapted to move said wedge, and cooperating means upon said body and screw for limiting the axial movement in opposite directions of said screw relative to said body.

7. In a cutting tool, a body having a generally radial slot and a generally radial recess intersecting the slot and provided at its inner end with an undercut portion, the width of the opening the intersection being less than the greatest width of the recess, a cutting blade extending within the slot, a generally radially movable wedge extending within the recess adapted to clamp said blade in place, a generally radial screw threadedly engaging said wedge and adapted to move the same into clamping relation with said blade, said screw having a head extending freely into the undercut portion of the recess and clearing said blade.

GEORGE E. SHELDRICK.